United States Patent
Chan (10) Patent No.: US 7,590,756 B2
(45) Date of Patent: Sep. 15, 2009

(54) METHOD AND SYSTEM FOR TRANSFERRING DATA IN A COMMUNICATIONS NETWORK USING REDUNDANT COMMUNICATION PATHS

(75) Inventor: Chi Chiu Chan, Wayne, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 765 days.

(21) Appl. No.: 11/128,355

(22) Filed: May 13, 2005

(65) Prior Publication Data

US 2006/0256768 A1     Nov. 16, 2006

(51) Int. Cl.
G06F 15/173     (2006.01)
(52) U.S. Cl. .................. 709/238; 709/239; 709/240; 370/225; 370/228; 370/231; 370/235; 370/237; 370/390; 370/389; 370/392
(58) Field of Classification Search ......... 709/238–240; 370/225, 228
See application file for complete search history.

(56) References Cited

U.S. PATENT DOCUMENTS

| | | | | |
|---|---|---|---|---|
| 4,308,613 | A | * | 12/1981 | Chasek .................. 370/396 |
| 5,485,465 | A | * | 1/1996 | Liu et al. .................. 714/4 |
| 5,671,215 | A | | 9/1997 | Foglar |
| 5,883,891 | A | | 3/1999 | Williams et al. |
| 6,034,961 | A | * | 3/2000 | Masuo et al. ............... 370/219 |
| 6,081,511 | A | | 6/2000 | Carr et al. |
| 6,094,439 | A | | 7/2000 | Krishna et al. |
| 6,307,834 | B1 | | 10/2001 | Worster |
| 6,408,000 | B1 | | 6/2002 | Lamberg et al. |
| 6,466,574 | B1 | | 10/2002 | Fujisaki et al. |
| 6,493,341 | B1 | | 12/2002 | Datta et al. |
| 6,587,438 | B1 | * | 7/2003 | Brendel .................. 370/238 |
| 6,661,775 | B1 | | 12/2003 | Nakayama et al. |
| 6,735,168 | B1 | | 5/2004 | Schnell et al. |

(Continued)

FOREIGN PATENT DOCUMENTS

EP     0 963 082 A3     5/1999

(Continued)

OTHER PUBLICATIONS

John Postel ED.; "Internet Protocol", *RFC 791*, Sep. 1981.

(Continued)

*Primary Examiner*—Bunjob Jaroenchonwanit
*Assistant Examiner*—Hua Fan
(74) *Attorney, Agent, or Firm*—Edell, Shapiro & Finnan, LLC (57) ABSTRACT

A communication node of the present invention automatically transmits original and duplicate packets over different paths in a communications network to improve delivery reliability of the packet and to decrease packet delivery time. A packet is typically marked for reliable transmission by the application layer of a source node, while a routing agent module within the node IP layer processes the marked packets. The marked packets are transmitted over redundant (e.g., primary and secondary) network paths from the source node to the destination node. The primary path is usually the shortest path between the source and destination nodes, while the secondary path is selected to avoid overlap with the primary path. The application or transport layer of the destination node filters or removes plural copies of received packets.

36 Claims, 4 Drawing Sheets

U.S. PATENT DOCUMENTS

| | | |
|---|---|---|
| 6,735,205 B1 | 5/2004 | Mankude et al. |
| 6,751,746 B1 | 6/2004 | Jain et al. |
| 6,771,594 B1 * | 8/2004 | Upadrasta ............... 370/228 |
| 6,873,618 B1 * | 3/2005 | Weaver ................... 370/390 |
| 7,433,301 B2 * | 10/2008 | Akahane et al. ........... 370/218 |
| 2002/0075873 A1 | 6/2002 | Lindhorst-Ko et al. |
| 2003/0065974 A1 | 4/2003 | Lam et al. |
| 2005/0152378 A1 * | 7/2005 | Bango et al. ............. 370/400 |
| 2005/0185587 A1 * | 8/2005 | Klinker .................. 370/237 |
| 2005/0281204 A1 * | 12/2005 | Karol et al. ............. 370/248 |

FOREIGN PATENT DOCUMENTS

WO  WO 2004/002083 A1  12/2003

OTHER PUBLICATIONS

Nichols, et al., "Definition of the Differentiated Services Field (DS Field) in the IPv4 and IPv6 Headers", *RFC 2474*, Dec. 1998.

Tannenbaum, Andrew S., *Computer Networks*, Second Edition, Prentice Hall, Englewood Cliffs, NJ, 1989.

* cited by examiner

METHOD AND SYSTEM FOR TRANSFERRING DATA IN A COMMUNICATIONS NETWORK USING REDUNDANT COMMUNICATION PATHS

BACKGROUND OF THE INVENTION

1. Technical Field

The present invention pertains to transmission of data within a communications network. In particular, the present invention pertains to a method and system for transferring data in a communications network in which plural copies of the data are sent simultaneously over different paths in the network to enhance reliability of data delivery.

2. Discussion of Related Art

A typical network includes several nodes that communicate with each other. Data travels from a source or originating node to a receiving or destination node along communication paths between network nodes. Each network has an overall architecture or design structure for the nodes that organizes the network and corresponding processes.

Successful delivery and receipt of data within a network can be determined by receipt of an acknowledgement message (ACK). An acknowledgement message (ACK) is a response from the receiving or destination node to the source or originating node. The message indicates that a data packet was received without errors and instructs the source node to send the next data packet. The acknowledgement message (ACK) is commonly sent between the receiving and originating nodes within a predetermined period of time or ACK timeout period. The network is commonly designed to wait for this predetermined time interval for the ACK message to be received from the destination node before taking further action (e.g., retransmission). With respect to a packet or message traversing several network nodes, the ACK timeout period, generally greater than twice the round trip delay for sending data in a network, may be long in order to avoid unnecessary retransmission over the same path. If no acknowledgement is received within a predetermined period for reply (e.g., a time out occurs), the packet is re-transmitted. Thus, a significant time interval can pass prior to discovery by a routing protocol of a failed path or an unsuccessful packet transmission. Further, the network likely re-transmits the packet on the same path when the routing protocol is unaware of the failed route, thereby preventing the re-transmitted packet from reaching its destination.

Current networks that require reliable and fast delivery are designed with redundant paths and large bandwidths. However, the network usually uses only one path at a time, where the utilized path is typically the shortest or lowest cost path. Failure of this single path may cause the packet to be undelivered in spite of the availability of redundant operational paths. Further, alternative paths may be used only after message delivery has failed, thereby increasing message delivery time since the source and/or intermediate nodes need to discover the failed path and switch to an alternative path. This is undesirable where speed of delivery is crucial.

Some current networks use a main router and a spare router within a node to hasten transition to a backup router in a multi-router environment in the event of failed data delivery. Inclusion or use of a spare router within the node does not improve the likelihood that a packet is delivered on the initial attempt. When a spare router is included, additional resources, such as additional IP addresses, are needed to support the spare router. This increases the demand for IP address space and the complexity of maintaining and synchronizing the network routing table. Further, including the spare router within the node increases the cost of producing that node. Moreover, current operational capabilities of routers do not provide for minimizing the path overlap between the main router and the spare router.

Figure 1:
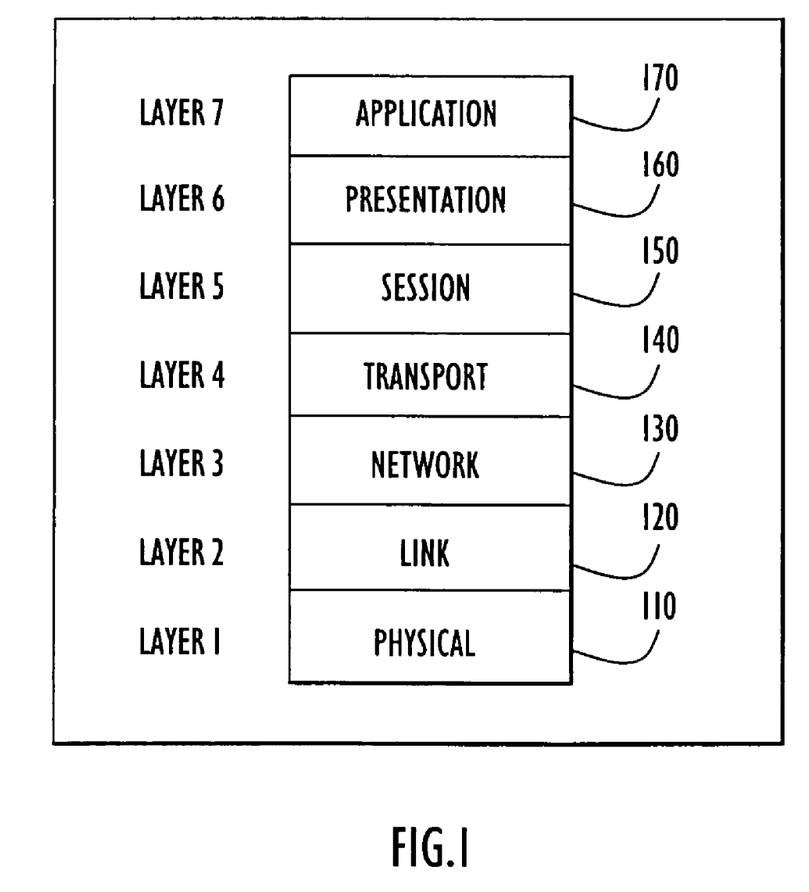
FIG. 1 is a block diagram of a conventional protocol architecture.

A network typically employs a conventional protocol arrangement. One type of arrangement includes the Open Systems Interconnection (OSI) Reference Model protocol stack as illustrated in FIG. 1. The stack includes a physical layer 110, a data link layer 120, a network layer 130, a transport layer 140, a session layer 150, a presentation layer 160 and an application layer 170. Each layer performs a predefined function (e.g., a group of related tasks). The physical, data link, network, and transport layers address transmission of data (e.g., packaging, routing, verifying, and transmitting data). These layers handle sending data regardless of the data type. The session, presentation and application layers are application-oriented (e.g., presenting the application interface) and are not concerned with the manner in which the data is transmitted.

Physical layer 110 handles the mechanical, electrical, functional, and procedural aspects of data transmission. Data link layer 120 provides control of physical layer 110, and detects and possibly corrects errors that can occur. This layer is concerned with signal interference on the physical transmission media commonly resulting from sources, such as cosmic rays and stray magnetic interference.

Network layer 130 provides the physical routing of the data (e.g., determining the path between nodes). This layer examines the network topology to determine the best route to send a message. The network layer is commonly referred to as the Internet Protocol (IP) layer and uses a routing protocol to determine the path along which data or a packet is sent.

Transport layer 140 establishes, maintains, and terminates communications between two nodes. This layer manages the manner in which data is sent, such as determining sending order and priority. The transport layer further checks that the data received at the destination node matches or is consistent with the data sent from the source or origination node.

Session layer 150 organizes and synchronizes the exchange of data between application processes. This layer works with application layer 170 to provide data to notify an application about the progress of transmission and reception of data. The session layer further provides timing and flow control by coordinating communications between different applications (e.g., communications about the status of each application). The session layer can resynchronize applications that are currently connected to each other, such as when communications are temporarily interrupted or when an error has occurred that results in loss of data.

Presentation layer 160 converts data from the application layer into a common format understandable and usable by the physical, data link, network and transport layers. Node-dependent data from the application layer is converted into node-independent format for the physical, data link, network and transport layers. The presentation layer does the reverse conversion for incoming data by converting data in node-independent format from the physical, data link, network and transport layers into node-dependent data for the application layer.

Application layer 170 is the end-user interface, where applications (e.g., electronic mail, database display modules, etc.) reside. This layer may display received information and send new user data to the physical, data link, network and transport layers.

In operation, when the IP layer receives a data packet from an upper stack layer, the IP layer selects a single path for delivery of the data packet to a destination. If the delivery attempt fails due to a bad path, the IP layer is unaware of this situation. The routing protocol used by the IP layer may discover a bad path and select a new path for the destination. However, data packets previously transmitted over the bad path are not delivered and, if no replacement data packets are generated by an upper stack layer, the destination does not receive data packets even though alternative paths may exist. The generation of a new data packet to replace the lost data packet using application or transport layer acknowledgement timeout and the discovery of a failed path by the routing protocol are slow. Further, time is required to switch from a failed to an alternative path based on a discovery time of the failed path by an IP routing protocol. This is undesirable for critical messages that need to reach their destination in the shortest time possible.

The networks described above generally increase message reliability by focusing on the ability to re-transmit and route a packet in response to a delivery failure. Basically, the networks find/switch to an alternative route for a packet in response to failure of an initial route as described above. However, this technique suffers from several disadvantages as described above, including undesired delay, failed delivery in the presence of alternative routes, and lack of enhancement of successful delivery on an initial attempt.

In an attempt to overcome these deficiencies, the related art provides an alternative technique employing plural routing paths. For example, U.S. Pat. No. 6,751,746 (Jain et al.) discloses a method of operating a fault tolerant connection in a network that includes a number of network elements and a number of links. Each of the network elements is coupled to at least one other of the network elements by at least one of the links. The method identifies a first path and a second path. The first path is between a first one of the network elements and a second one of the network elements, as is the second path. Moreover, the first path and the second path are disjoint. This disjointedness can be any difference between the two paths (e.g., any combination of different network elements or links). A packet is sent from the first one of the network elements via the first path, while a duplicate packet is sent from the first one of the network elements via the second path. Once these packets have been sent, at least one of the packet and the duplicate packet are received at the second one of the network elements. If both the packet and the duplicate packet are received at the second one of the network elements, one of the two is discarded (e.g., by simply ignoring the last one received).

This technique similarly suffers from several disadvantages. In particular, the network routers employed must be specialized to handle the multiple packets that are sent along different paths. The routers are customized to include a label switching protocol or to modify routing tables to force the packets along the disjoint paths. However, the specialized routers increase the expense and complexity of producing nodes for the network. In addition, the specialized routers prevent use of the technique with networks employing conventional routers, thereby requiring a substantial overhaul of the network to implement the technique.

SUMMARY OF THE INVENTION

According to the present invention, original and duplicate data packets are transferred simultaneously using different paths in a communications network from a source node to a destination node. A communication node of the present invention automatically transmits those packets over different paths in the communications network to improve delivery reliability of the packet and to decrease packet delivery time.

The node employs conventional routing protocols to determine routes (e.g., a primary path and a secondary path) for the original and duplicate packets, while a routing agent module within a node IP layer performs route selection to minimize overlap between those paths.

A packet is typically marked for reliable transmission by the application layer of a source node, while the routing agent module within the node IP layer processes the marked packets. The marked packets are transmitted over redundant (e.g., primary and secondary) network paths from the source node to the destination node. The primary path is usually determined to be the shortest path between the source node and the destination node, while the secondary path is selected to avoid overlap with the primary path. The application or transport layer of the destination node filters or removes plural copies of received packets.

The above and still further features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

The present invention simultaneously transfers plural copies of packets or data over different paths in a network to increase delivery reliability. Specifically, a network node of the present invention automatically transmits an original and a corresponding duplicate packet to a destination simultaneously over respective primary and secondary communication paths to improve reliability of packet delivery and shorten delivery time. The node uses conventional communication and/or routing protocols to route the packets and selects routes using criteria to minimize overlap between primary and secondary communication paths. The node preferably employs the protocol stack described above for FIG. 1. A routing agent module within the IP protocol stack layer of a present invention source node duplicates and routes packets over the selected communication paths as described below.

The network layer of a present invention node preferably utilizes the conventional Internet Protocol (IP) for communications. Basically, this protocol employs a packet header containing information to perform communication functions (e.g., addressing, fragmentation of data, etc.). The IP header typically includes fields for: version or format of the header; Internet Header Length (IHL); type of service; total length of the packet; an identification used for assembling fragments; fragment control flags; fragment offset indicating the location within the packet for a fragment; time to live indicating the maximum time interval the packet resides in the network; next level protocol used in the packet data portion; header checksum; source address; destination address; options for additional controls or functions; and padding or filler. The fields of the IP header may be utilized to mark or identify packets for reliable transmission according to the present invention and to enforce selected routing paths as described below. For operational examples of the Internet Protocol, reference is made to "Internet Protocol" by J. Postel, RFC 791, September 1981, the disclosure of which is incorporated herein by reference in its entirety.

Figure 2:
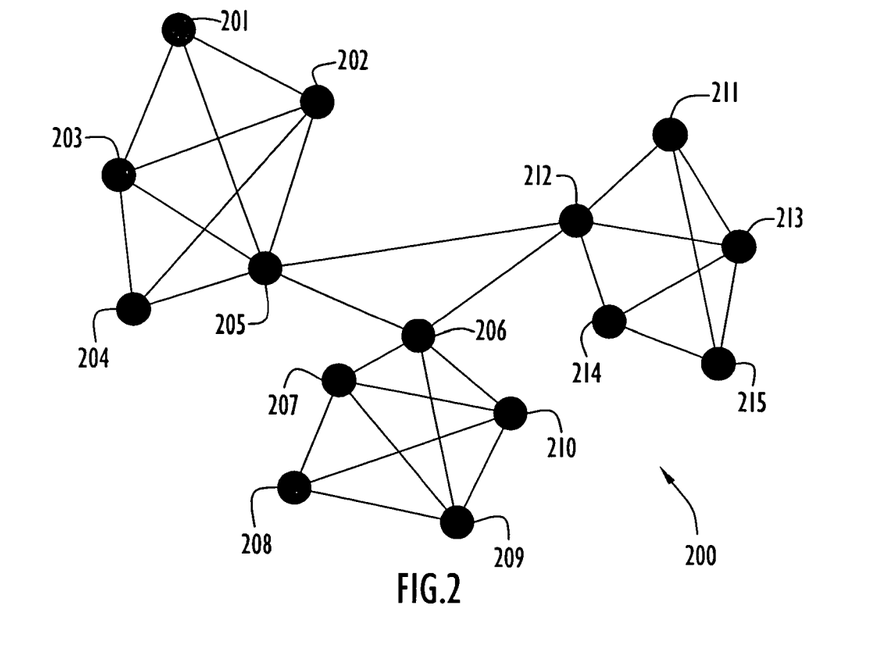
FIG. 2 is a diagrammatic illustration of an exemplary network employing the present invention with an unsymmetrical topology.
Figure 3:
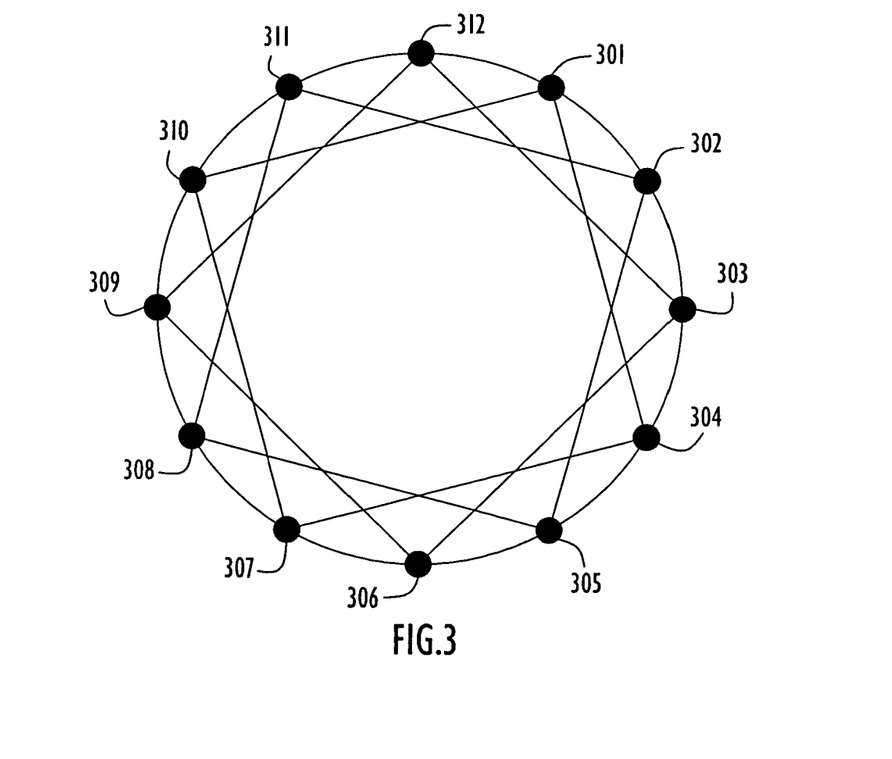
FIG. 3 is a diagrammatic illustration of an exemplary network employing the present invention with a symmetrical topology.

An exemplary network employing the present invention includes a plurality of network nodes arranged in a predetermined network topology, typically in the form of a flat, multi-hop network (FIGS. 2-3). Communication paths extend between nodes, where each node may serve as either a source node providing data to be transmitted, a destination node to receive transmitted data from the source node, or an intermediate node to receive transmitted data and relay the data along a selected path. The present invention transfers original and corresponding duplicate packets or data along different paths from a source node to a destination node in order to enhance reliability of data delivery.

By way of example, a communications network employing the present invention may include an unsymmetrical topology as illustrated in FIG. 2. Specifically, network 200 includes a plurality of nodes 201-215 arranged in an unsymmetrical configuration. When original and duplicate packets are transmitted over different paths, intermediate nodes along those paths may adjust the routing path for a packet. The unsymmetrical topology of network 200 may enable the intermediate nodes to provide adjusted primary and secondary paths that overlap or merge. If an overlapped or merged portion of the primary and secondary paths fails, each path is unable to deliver the packet to the destination. Accordingly, the present invention determines and selects paths with minimum or no overlap to enhance reliability. In order to ensure that the selected paths are followed, an IP protocol option of strict source routing is utilized to enforce the selected routes and avoid overlaps between primary and secondary packet transmission paths. This option basically forces intermediate nodes to follow the selected paths and may be triggered from the IP header as described below.

Alternatively, a communications network employing the present invention may include a symmetrical topology as illustrated in FIG. 3. Specifically, network 300 includes a plurality of nodes 301-312 arranged to form a symmetrical configuration. This type of configuration may provide only non-overlapping paths to a destination for a packet. In this case, intermediate nodes may adjust routes without concern for overlap between primary and secondary paths, thereby enabling employment of an IP loose source routing option and obviating the need for strict source routing. The loose source routing option enables intermediate nodes to utilize any suitable paths and may similarly be triggered from the IP header as described below.

Figure 4:
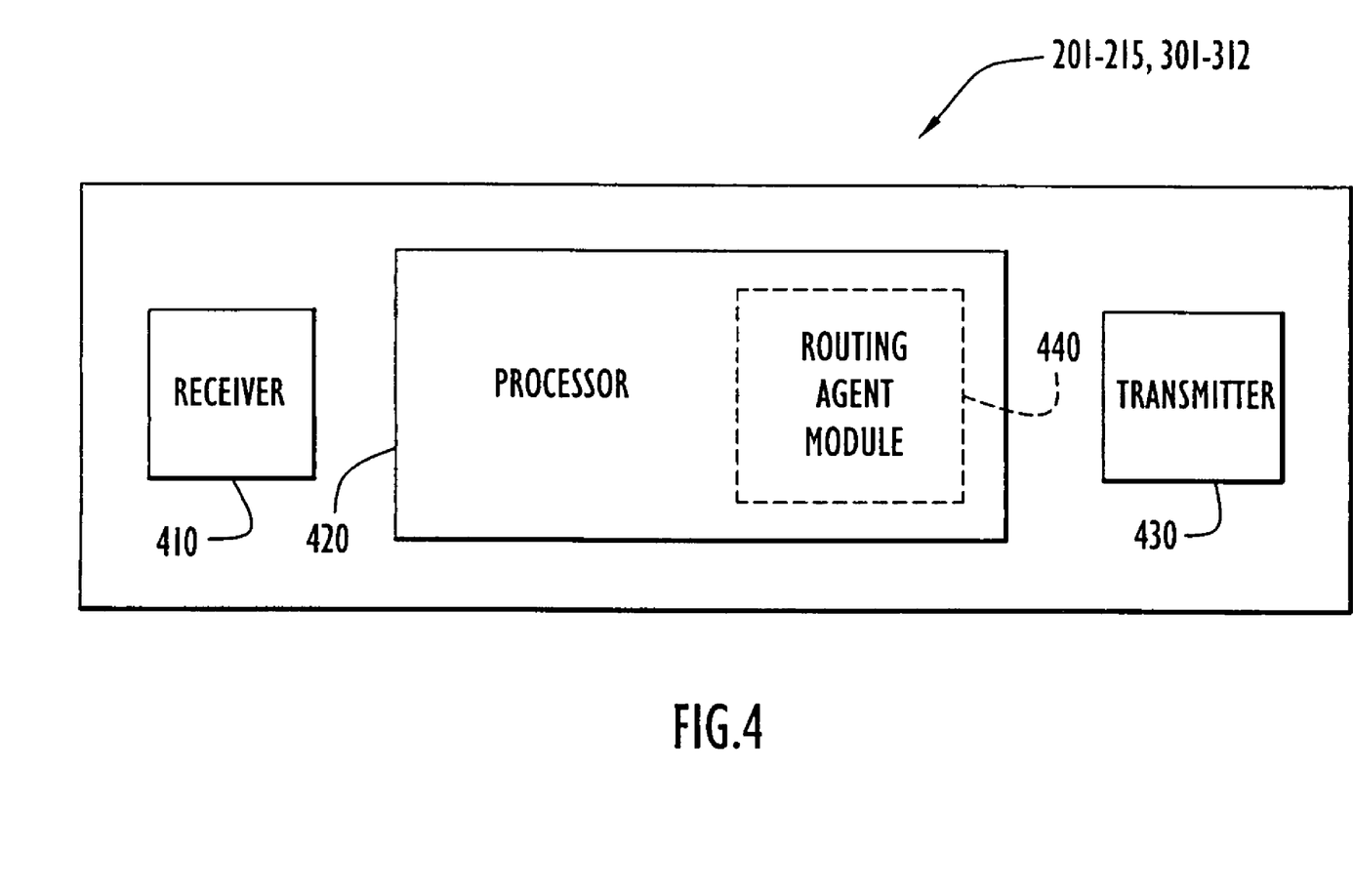
FIG. 4 is a block diagram of a network node according to the present invention.

A network node according to the present invention is illustrated in FIG. 4. In particular, each network node (e.g., nodes 201-215 of FIG. 2 and nodes 301-312 of FIG. 3) includes a receiver 410, a processor 420, and a transmitter 430. Processor 420 is preferably implemented by a conventional microprocessor or controller and controls the node to transmit and receive messages in accordance with a communication protocol. Receiver 410 is typically implemented by a conventional receiver and configured to receive signals transmitted by the transmitter of another node for processing by processor 420. Transmitter 430 is preferably implemented by a conventional transmitter and transmits messages in accordance with processor instructions. The node preferably implements the Open Systems Interconnection (OSI) Reference Model protocol stack described above for FIG. 1. The functions of the various protocol stack layers may be implemented by hardware and/or software modules and may be distributed among the node components (e.g., processor, receiver, transmitter, etc.) in any desired fashion.

In order to simultaneously transmit packets over primary and secondary paths, a source node and destination node each include a routing agent module 440 within processor 420. The routing agent module resides in the IP layer of the node protocol stack and enables simultaneous transmission of a packet from a source node to a destination node over different paths in the network. The routing agent module further filters plural copies of packets received at the destination node. Intermediate nodes along the primary and secondary paths may be implemented by conventional nodes (e.g., without the routing agent module) to relay the packet to the destination. This enables the present invention to be utilized with conventional nodes or routers and obviates the need to overhaul a network with specialized nodes as described above. In the event that plural paths are unavailable from a source node, the intermediate nodes may include the routing agent module to determine and transmit packets over primary and secondary paths as described above. The routing agent module is preferably implemented as a software module or unit, but may be implemented by any quantity of hardware and/or software modules or units within any of the protocol stack layers.

Figure 5:
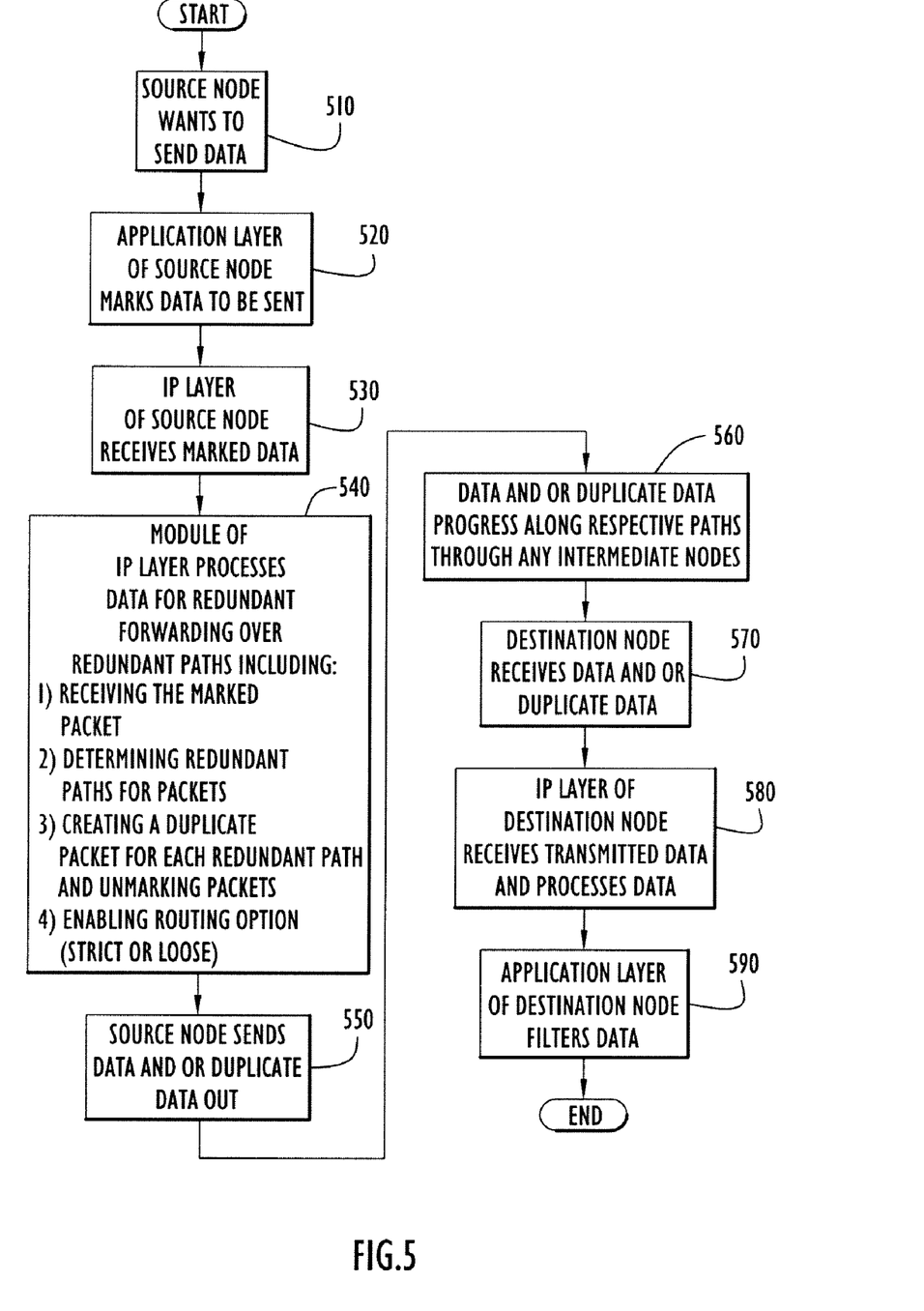
FIG. 5 is a procedural flowchart illustrating the manner in which a packet is transmitted through a network according to the present invention.

The manner in which data is sent between a source node and a destination node according to the present invention is illustrated FIG. 5. In particular, the application layer of a source node selects a data packet for transmission at step 510 and marks or identifies the packet for reliable transmission according to the present invention at step 520. The application layer preferably utilizes particular bits of the packet IP header to mark the packet. Basically, the IP header includes a conventional Differentiated Services Code Point (DSCP) field to indicate the type of services desired for a packet. This field generally supersedes the type of service field of the IP header described above. The initial three bits (e.g., bits zero through two) of the DSCP field correspond to precedence bits and indicate packet priority. The next three bits (e.g., bits three through five) of the DSCP field respectively indicate the delay (D), throughput (T) and reliability (R) for the packet. These bits are initially set to zero, where the delay and reliability bits (e.g., bits three and five) may be set to one to mark or identify the packet for reliable transmission according to the present invention. The application layer provides the settings for the protocol stack process that generates the IP header for the packet. The final two bits (e.g., bits six and seven) of the DSCP field are reserved for future use. For operational examples of the DSCP field, reference is made to "Definition of the Differentiated Services Field (DS Field) in the IPv4 and IPv6 Headers" by Nichols et al., RFC 2474, December 1998, the disclosure of which is incorporated herein by reference in its entirety.

The selected packet is transferred to the IP layer of the source node at step 530. Since the packet is marked, the IP layer transfers the packet to the routing agent module for processing. When an unmarked packet is received, the IP layer processes the packet in a conventional manner (e.g., without transference to the routing agent module). The routing agent module receives the marked packet and creates duplicate packets and determines redundant paths for packet transmission at step 540. Specifically, when the marked packet is received by the routing agent module, the module uses the routing database that is available to the IP layer to select a primary path and a secondary path to the destination node. The IP layer may utilize any conventional techniques to determine and select a primary path (e.g., shortest path first algorithm, etc.) for transmission of the original packet. The routing agent module further determines a secondary path for transmission of a duplicate of the original packet by identifying paths with the minimum amount of overlap with the primary path and selecting the shortest of the identified paths. The routing agent module may utilize one or more secondary paths for transmission of duplicate packets. In the case of plural secondary paths, the routing agent module determines those paths based on minimum overlap with previously determined or selected primary and secondary paths. The quantity of secondary paths utilized is based on the reliability requirements of the communications network and the capacity of the network to handle additional traffic loads of the secondary paths.

Once the primary and secondary paths are determined, the routing agent module generates a duplicate of the original packet for each secondary path and unmarks the original and duplicate packets (e.g., resets the delay and reliability bits of the DSCP field of the IP header) to prevent any intermediate nodes with the routing agent module from performing the redundant forwarding or reliable transmission of the present invention. By way of example only, the present invention preferably transmits User Datagram Protocol (UDP) and Transmission Control Protocol (TCP) packets, but may be used with any packet types or formats.

The original and duplicate packets are subsequently processed by the IP layer for transmission. In order to prevent re-routing of the packets by intermediate nodes, the IP option of strict source routing (e.g., IP Option type 137) may be utilized. This option may be invoked from the option field of the packet IP header and directs the IP Protocol to send packets along the designated route or path. The strict source routing option prevents re-routing of the packets from the selected paths to paths that may overlap or merge. However, the strict source routing option may be unnecessary for certain network topologies (e.g., FIG. 3) where the selected paths cannot overlap or merge once the packets reach their respective next hop addresses or nodes as described above. In this case, the IP option of loose source routing may be invoked from the option field of the packet IP header and basically enables intermediate nodes to utilize any suitable route. The IP protocol option of loose source routing may be further utilized in the case of very large networks, where a complete network topology may not be available to a source node and the path for a packet may vary, thereby preventing specification of an end-to-end route. The loose source routing option basically associates the primary and secondary paths with different source node interfaces, thereby maximizing the chance that the later portion of the paths do not overlap or merge.

In the event separate redundant paths are unavailable from the source node, the original marked packet is returned to the IP layer (e.g., without duplicate packets) for conventional subsequent processing and routing. Intermediate nodes may include the routing agent module to perform redundant forwarding or reliable transmission functions of the present invention for the marked packet in substantially the same manner described above. The DSCP field of the marked packet is typically utilized to notify an intermediate node that the packet is to be processed by the routing agent module for reliable transmission as described above.

The original and duplicate packets are sent from the source node along their respective paths at step 550 and traverse intermediate nodes of the network at step 560. The intermediate nodes are preferably implemented without the routing agent modules and process the packets in a conventional manner for transmission to a next hop in the routing path. However, one or more intermediate nodes may include the routing agent module to perform redundant forwarding according to the present invention in response to unavailable redundant paths at the source node as described above. The original and/or duplicate packets reach the destination node at step 570, where the destination node similarly includes a routing agent module within the node IP layer. The IP layer receives and processes the original and/or duplicate packets at step 580, while the application layer filters the original and/or duplicate packets at step 590. Basically, the application layer discards additional copies of packets since this layer marks packets and consequently expects reception of plural packet copies. If TCP packets are used instead of UDP packets, the node transport layer may filter the packets.

Operation of the present invention is described with reference to exemplary network 200 of FIG. 2. Initially, the paths between network nodes are considered independent and of equal cost. By way of example, node 204 desires to send a message to node 215. The source node selects the data to be sent, while the application layer marks associated packets for reliable transmission according to the present invention as described above. The marked packets are passed from the application layer to the IP layer, where the routing agent module produces duplicate packets and selects primary and secondary paths for respective transmission of the original and duplicate packets as described above.

The primary paths available for transmission include either nodes 204-205-212-211-215, nodes 204-205-212-213-215 or nodes 204-205-212-214-215. The node typically selects the shortest path as the primary path. However, since the available primary paths each have the same length, the path selection is arbitrary and the source node may utilize any desired schemes to select a path (e.g., first path, last path, random selection, etc.). If the primary path selected includes nodes 204-205-212-211-215, candidates for secondary paths include either nodes 204-203-205-206-212-213-215, nodes 204-203-205-206-212-214-215, or nodes 204-202-205-206-212-214-215, where the secondary path choices are longer than the primary path. The node typically selects the shortest path as the secondary path, and may utilize any scheme when available paths have the same length as described above. At the destination node (node 215), the IP layer receives and processes the original and duplicate packets, while the application layer filters or removes plural copies of the packets.

For most networks, the primary path is utilized without the IP option of strict source routing since the primary path is the shortest path by design. However, if the shortest path is not unique, as in this example, strict source routing is necessary to prevent overlap with the secondary path by forcing a packet along a route as described above. This enables the secondary path to be an independent redundant path for forwarding a duplicate packet.

Strict source routing may not be necessary for certain network topologies (e.g., FIG. 3.), where paths cannot merge once the original and duplicate packets reach their next different hop addresses or nodes. By way of example, node 312 of network 300 (FIG. 3) desires to send a data packet to node 306. The source node selects the data to be sent, while the application layer marks the associated packets for reliable transmission according to the present invention as described above. The packets are received at the IP layer, where the routing agent module produces a duplicate packet and selects primary and secondary paths for transmission of the original and duplicate packets, respectively, as described above.

Suitable primary paths include either nodes 312-309-306, or nodes 312-303-306. The next hops in the primary and/or secondary paths (e.g., depending upon the selection) include either node 303 or node 309. Once the data reaches nodes 303 and 309, the paths to destination node 306 cannot overlap or merge, thereby rendering strict source routing unnecessary. In this case, loose source routing may be employed as described above. At the destination node (node 306), the IP layer receives and processes the original and/or duplicate packets, while the application layer filters or removes plural copies of the packets.

It will be appreciated that the embodiments described above and illustrated in the drawings represent only a few of the many ways of implementing method and system for transferring data in a communications network using redundant communication paths.

It is to be understood that the present invention is not limited to the applications or networks described herein, but may be utilized for various communication applications or networks. For example, the present invention may be applied to space, airborne, or ground based sensor wireless military networks and commercial wired and wireless networks.

The present invention may be utilized with any type of network including any quantity of nodes arranged in any type of configuration (e.g., cluster based, CBT, Ad-Hoc wireless, wired, unsymmetrical, symmetrical, plural tiers, etc.). Any quantity of network nodes may serve as source, intermediate and/or destination nodes to transfer information, where the node type may be assigned in any fashion via any conventional or other techniques (e.g., predetermined, dynamically assigned, etc.). The routing agent module may be included within any quantity of any desired source, destination and intermediate nodes. The network nodes may communicate via any suitable communications medium (e.g., wired or wireless communication devices, etc.) and/or protocols (e.g., TCP, IP, UDP, etc.).

The present invention node may include any quantity of conventional or other transmitters, receivers, and/or transceivers, where each transmitter or transceiver may transmit signals at any suitable frequency and/or in any suitable energy form (e.g., radio signals, microwave, optical signals, electrical signals, etc.), and any quantity of conventional or other receivers or transceivers, where each receiver or transceiver may receive signals at any suitable frequency and/or in any suitable energy form (e.g., radio signals, microwave, optical signals, electrical signals, etc.). The present invention node may include any quantity of independent transmitting and/or receiving devices, may utilize any quantity of frequency channels of any desired frequencies and may send any type of data. The present invention node may further include any quantity of any types of devices for a particular application.

The processor of the present invention node may be implemented by any conventional or other microprocessor, controller or circuitry to perform the functions described herein, while any quantity of processors or processing devices or circuitry may be employed within the present invention node where the node functions may be distributed in any fashion among any quantity of hardware and/or software modules, processors or other processing devices or circuits. The software (e.g., agent routing module, protocol layers, etc.) for the processor of the present invention node may be implemented in any suitable computer language, and could be developed by one of ordinary skill in the computer and/or programming arts based on the functional description contained herein and the flow chart illustrated in the drawings. Further, any references herein of software performing various functions generally refer to processors performing those functions under software control. The software and/or algorithms described above and illustrated in the flow chart may be modified in any manner that accomplishes the functions described herein. The present invention node may alternatively include any components arranged in any fashion to facilitate information transfer in the manner described above.

The data, packets or messages transmitted by the network may be of any size, may have any format, and may contain any desired information. The packets may be transmitted via any transmission scheme and/or at any suitable transmission rate (e.g., with any desired interval between transmissions). The various messages or packets may include any suitable header, identifier or other information to identify various packet characteristics (e.g., the type of message or packet, type of service, various protocol options, etc.). The packets may be broadcasted or transmitted any quantity of times.

The present invention node may employ any suitable protocol arrangement (e.g., OSI Protocol Stack, etc.). The various functions of the protocol arrangement may be implemented by any quantity or combination of hardware and/or software modules and may be distributed in any fashion among the node components (e.g., transmitter, receiver, processor, etc.). The present invention node preferably employs the Internet Protocol, but may utilize any quantity of any conventional or other communications protocols. The routing agent module may be implemented by any quantity of hardware and/or software modules and may reside within any suitable layer or layers of the protocol arrangement.

The present invention may utilize any type of identifier or other indicator to mark data or packets for reliable transmission. The marking may utilize any quantity of any bits from any desired data or packet portion (e.g., any packet fields, any header fields, etc.). The bits utilized for marking may be set to any desired values (e.g., zero, one, etc.) to identify the data or packet for reliable transmission. The marking may be performed at any desired layer of the protocol arrangement.

The primary path may be selected based on any conventional or other technique (e.g., shortest path first, lowest cost path, etc.). The present invention may utilize any quantity of secondary paths to transfer any quantity of duplicate packets. The secondary paths may be selected based on any conventional or other technique, where the secondary paths preferably include no or minimal overlap with the primary path and/or other secondary paths. However, the secondary paths may include any desired amount of overlap depending upon the desired reliability. The present invention may utilize any conventional or other scheme (e.g., select first path, select last path, randomly select path, etc.) to select among a plurality of primary and secondary path candidates having substantially similar properties (e.g., same length, same amount of overlap, etc.).

The present invention may utilize any suitable techniques or protocol options to enforce packets along selected primary and secondary paths and/or ensure the packets are transmitted along paths with no or minimal overlap (e.g., strict source routing, loose source routing, etc.). The present invention node may be utilized with any quantity of conventional nodes within a network to perform reliable transmission. The destination node may utilize any conventional or other techniques to identify and remove plural copies of packets. The packet filtering or removal may be performed within any protocol arrangement layer. The primary and secondary paths may be utilized in any desired fashion to transmit packets, where each path may transmit any quantity of original and/or duplicate packets. The duplicate packets may include any desired information in addition to that of the original packet and/or any portion of information (e.g., all the information, a subset of the information, etc.) from the original packet sufficient for the reliable transfer.

The software (e.g., agent routing module, software within protocol layers, etc.) of the present invention may be available on a recordable or computer readable medium (e.g., magnetic or optical mediums, magneto-optic mediums, floppy diskettes, CD-ROM, memory devices, DVD, etc.) for use on devices (e.g., stand-alone or devices connected by a network or other communications medium), and/or may be downloaded (e.g., in the form of carrier waves, packets, etc.) to devices via a network or other communications medium.

From the foregoing description, it will be appreciated that the invention makes available a novel method and system for transferring data in a communications network using redundant communication paths, wherein data is duplicated and transmitted along different communications paths within a network for reliable transfer of the data between source and destination network nodes.

Having described preferred embodiments of a new and improved method and system for transferring data in a communications network using redundant communication paths, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A communication node of a communications network to reliably transfer data to a destination node comprising:
a transmitter to transmit outgoing information to at least one other communication node within said network;
a receiver to receive incoming information from at least one other communication node within said network; and
a processor to control said transmission and reception of said outgoing and incoming information, wherein said processor includes:
a marking module to determine one or more packets for reliable transmission and insert an indicator within the determined packets to identify those packets for reliable transmission in response to said communication node being a source node, wherein a packet includes an Internet Protocol header and said marking module includes a field module to assign values to at least a portion of said packet header to identify said packet for said reliable transmission;
an agent module to perform routing functions, wherein said agent module includes:
a primary module to determine a primary routing path for an identified packet utilizing information within a routing database;
a secondary module to determine a secondary routing path for said identified packet utilizing information within said routing database, wherein said secondary path is the shortest path available including minimum overlap with said primary path; and
a transmission module, responsive to availability of said secondary routing path, to generate a duplicate of said identified packet, to remove said indicator from said identified and duplicate packets, and to transmit said identified packet and said duplicate packet over said primary and secondary paths, respectively, wherein said identified and duplicate packets are in the form of routing protocol packets, and wherein a routing option of said routing protocol is enabled to control propagation of said identified and duplicate packets through said network.

2. The node of claim 1, wherein said routing option directs said routing protocol to enable traversal of said identified and duplicate packets along said respective primary and secondary paths without re-routing of those packets.

3. The node of claim 1, wherein said routing option directs said routing protocol to enable traversal of said identified and duplicate packets along said respective primary and secondary paths with selective re-routing of those packets.

4. The node of claim 1, wherein said network includes at least one intermediate node between said node and said destination node, wherein each intermediate node lacks said marking and agent modules and employs said routing protocol to route said identified packet and said duplicate packet along said respective primary and secondary paths, and wherein said identified packet and said duplicate packet are processed in accordance with said routing protocol and said enabled routing option to propagate said identified packet and said duplicate packet along said respective primary and secondary paths.

5. The node of claim 1, wherein said network includes at least one intermediate node between said node and said destination node, wherein at least one intermediate node includes said agent module to perform said routing functions in response to receiving said identified packet and at least one of said primary and secondary paths being unavailable at said node.

6. The node of claim 1, wherein said processor further includes:
a filter module to receive packets from said primary and secondary paths and to remove packets that are copies of received packets in response to said node being a destination node.

7. The node of claim 1, wherein said routing protocol includes the Internet Protocol.

8. The node of claim 7, wherein said routing protocol option includes at least one of strict source routing and loose source routing.

9. The node of claim 1, wherein said secondary module determines a plurality of secondary routing paths for said identified packet and said transmission module, responsive to availability of said plurality of secondary routing paths, generates a duplicate of said identified packet for each available secondary path, removes said indicator from said identified and duplicate packets, and transmits said identified packet and said duplicate packets over said primary and secondary paths, respectively.

10. The node of claim 7, further including a communication protocol architecture with a plurality of layers including an Internet Protocol layer, and said agent module resides within said Internet Protocol layer.

11. A communications network to reliably transfer data comprising:
at least one source node to transmit a packet, wherein said source node includes:
a marking module to determine one or more packets for reliable transmission and insert an indicator within the determined packets to identify those packets for reliable transmission, wherein a packet includes an Internet Protocol header and said marking module includes a field module to assign values to at least a portion of said packet header to identify said packet for said reliable transmission;
an agent module to perform routing functions, wherein said agent module includes:

a primary module to determine a primary routing path for an identified packet utilizing information within a routing database;

a secondary module to determine a secondary routing path for said identified packet utilizing information within said routing database, wherein said secondary path is the shortest path available including minimum overlap with said primary path; and a transmission module, responsive to availability of said secondary routing path, to generate a duplicate of said identified packet, to remove said indicator from said identified and duplicate packets, and to transmit said identified packet and said duplicate packet over said primary and secondary paths, respectively, wherein said identified and duplicate packets are in the form of routing protocol packets, and wherein a routing option of said routing protocol is enabled to control propagation of said identified and duplicate packets through said network;

at least one intermediate node between said source node and a destination, wherein each intermediate node employs said routing protocol to route said identified packet and said duplicate packet along said respective primary and secondary paths, and wherein said identified packet and said duplicate packet are processed in accordance with said routing protocol and said enabled routing option to propagate said identified packet and said duplicate packet along said respective primary and secondary paths; and at least one destination node to receive packets from said primary and secondary paths and to remove packets that are copies of received packets.

12. The network of claim 11, wherein said routing option directs said routing protocol to enable traversal of said identified and duplicate packets along said respective primary and secondary paths without re-routing of those packets by said at least one intermediate node.

13. The network of claim 11, wherein said routing option directs said routing protocol to enable traversal of said identified and duplicate packets along said respective primary and secondary paths with selective re-routing of those packets by said at least one intermediate node.

14. The network of claim 11, wherein each intermediate node lacks said marking and agent modules and employs said routing protocol to route said identified packet and said duplicate packet along said respective primary and secondary paths, and wherein said identified packet and said duplicate packet are processed in accordance with said routing protocol and said enabled routing option to propagate said identified packet and said duplicate packet along said respective primary and secondary paths.

15. The network of claim 11, wherein at least one intermediate node includes said agent module to perform said routing functions in response to receiving said identified packet and at least one of said primary and secondary paths being unavailable at said source node.

16. The network of claim 11, wherein said routing protocol includes the Internet Protocol.

17. The network of claim 16, wherein said routing protocol option includes at least one of strict source routing and loose source routing.

18. The network of claim 11, wherein said secondary module determines a plurality of secondary routing paths for said identified packet and said transmission module, responsive to availability of said plurality of secondary routing paths, generates a duplicate of said identified packet for each available secondary path, removes said indicator from said identified and duplicate packets, and transmits said identified packet and said duplicate packets over said primary and secondary paths, respectively.

19. The network of claim 16, wherein each node further includes a communication protocol architecture with a plurality of layers including an Internet Protocol layer, and said agent module resides within said Internet Protocol layer.

20. A program product apparatus including a computer readable storage medium with computer program logic recorded thereon for reliably transferring data within a network comprising:

a marking module to determine one or more packets for reliable transmission and insert an indicator within the determined packets to identify those packets for reliable transmission, wherein a packet includes an Internet Protocol header and said marking module includes a field module to assign values to at least a portion of said packet header to identify said packet for said reliable transmission;

an agent module to perform routing functions, wherein said agent module includes:

a primary module to determine a primary routing path for an identified packet utilizing information within a routing database;

a secondary module to determine a secondary routing path for said identified packet utilizing information within said routing database, wherein said secondary path is the shortest path available including minimum overlap with said primary path; and a transmission module, responsive to availability of said secondary routing path, to generate a duplicate of said identified packet, to remove said indicator from said identified and duplicate packets, and to facilitate transmission of said identified packet and said duplicate packet over said primary and secondary paths, respectively, wherein said identified and duplicate packets are in the form of routing protocol packets, and wherein a routing option of said routing protocol is enabled to control propagation of said identified and duplicate packets through said network.

21. The apparatus of claim 20, wherein said routing option directs said routing protocol to enable traversal of said identified and duplicate packets along said respective primary and secondary paths without re-routing of those packets.

22. The apparatus of claim 20, wherein said routing option directs said routing protocol to enable traversal of said identified and duplicate packets along said respective primary and secondary paths with selective re-routing of those packets.

23. The apparatus of claim 20 further including:

a filter module to receive packets from said primary and secondary paths and to remove packets that are copies of received packets.

24. The apparatus of claim 20, wherein said routing protocol includes the Internet Protocol.

25. The apparatus of claim 24, wherein said routing protocol option includes at least one of strict source routing and loose source routing.

26. The apparatus of claim 20, wherein said secondary module determines a plurality of secondary routing paths for said identified packet and said transmission module, in response to availability of said plurality of secondary routing paths, generates a duplicate of said identified packet for each available secondary path, removes said indicator from said identified and duplicate packets, and facilitates transmission of said identified packet and said duplicate packets over said primary and secondary paths, respectively.

27. The apparatus of claim 24, wherein said network includes a communication protocol architecture of a plurality of layers including an Internet Protocol layer, and said agent module performs said routing functions within said Internet Protocol layer.

28. A method of transmitting packets within a network from a source node through at least one intermediate node to a destination node comprising:
   (a) determining one or more packets for reliable transmission and inserting an indicator within the determined packets to identify those packets for reliable transmission at said source node, wherein a packet includes an Internet Protocol header and step (a) further includes:
      (a.1) assigning values to at least a portion of said packet header to identify said packet for said reliable transmission;
   (b) determining a primary routing path for an identified packet at said source node utilizing information within a routing database;
   (c) determining a secondary routing path for said identified packet at said source node utilizing information within said routing database, wherein said secondary path is the shortest path available including minimum overlap with said primary path;
   (d) in response to said secondary routing path being available, generating a duplicate of said identified packet at said source node, removing said indicator from said identified and duplicate packets, and transmitting said identified packet and said duplicate packet over said primary and secondary paths, respectively, wherein said identified and duplicate packets are in the form of routing protocol packets, and wherein a routing option of said routing protocol is enabled to control propagation of said identified and duplicate packets through said network; and
   (e) receiving packets from said primary and secondary paths and removing packets that are copies of received packets at said destination node.

29. The method of claim 28, wherein said routing option directs said routing protocol to enable traversal of said identified and duplicate packets along said respective primary and secondary paths without re-routing of those packets by said at least one intermediate node.

30. The method of claim 28, wherein said routing option directs said routing protocol to enable traversal of said identified and duplicate packets along said respective primary and secondary paths with selective re-routing of those packets by said at least one intermediate node.

31. The method of claim 28, wherein each intermediate node employs said routing protocol to route said identified packet and said duplicate packet along said respective primary and secondary paths without performing said steps (a)-(d), and wherein said identified packet and said duplicate packet are processed in accordance with said routing protocol and said enabled routing option to propagate said identified packet and said duplicate packet along said respective primary and secondary paths.

32. The method of claim 28, wherein at least one intermediate node performs said steps (b)-(d) in response to receiving said identified packet and at least one of said primary and secondary paths being unavailable at said source node.

33. The method of claim 28, wherein said routing protocol includes the Internet Protocol.

34. The method of claim 33, wherein said routing protocol option includes at least one of strict source routing and loose source routing.

35. The method of claim 28, wherein step (c) further includes:
   (c.1) determining a plurality of secondary routing paths for said identified packet; and
   step (d) further includes:
   (d.1) in response to availability of said plurality of secondary routing paths, generating a duplicate of said identified packet for each available secondary path, removing said indicator from said identified and duplicate packets, and transmitting said identified packet and said duplicate packets over said primary and secondary paths, respectively.

36. The method of claim 33, wherein said network includes a communication protocol architecture with a plurality of layers including an Internet Protocol layer, and said steps (b)-(d) are performed within said Internet Protocol layer.

* * * * *